United States Patent [19]

Kimura et al.

[11] Patent Number: 4,747,383

[45] Date of Patent: May 31, 1988

[54] IGNITION TIMING CONTROL METHOD FOR INTERNAL COMBUSTION ENGINES

[75] Inventors: Shigehiro Kimura, Niiza; Takashi Ono, Wakoh; Nobuyuki Narisawa, Toshima, all of Japan

[73] Assignee: Honda Giken Kogyo Kabushiki Kaisha, Tokyo, Japan

[21] Appl. No.: 865,524

[22] Filed: May 21, 1986

[30] Foreign Application Priority Data

May 27, 1985 [JP] Japan ................................ 60-113756

[51] Int. Cl.$^4$ ............................................. F02P 5/04
[52] U.S. Cl. ..................................... 123/422; 123/418
[58] Field of Search ................................. 123/422, 418

[56] References Cited

U.S. PATENT DOCUMENTS 4,112,890  9/1978  Manger ................................ 123/422
4,337,744  7/1982  Seeger ................................. 123/422
4,562,812  1/1986  Chauvel ............................... 123/418
4,570,594  2/1986  Egami ................................. 123/422

Primary Examiner—Ronald B. Cox
Attorney, Agent, or Firm—Lyon & Lyon

[57] ABSTRACT

An ignition timing control method for an internal combustion engine in which an ignition advance angle value conforming to the operating condition of the engine is set, an ignition timing is obtained by applying an angle-time conversion to a crank angle extending from a reference crank angle position to a position corresponding to the ignition advance angle value, and ignition is effected upon lapse of the ignition timing from an instant at which the reference crank angle position is sensed. Engine rotational speed value is sensed at least at two particular crank angle positions, and each sensed rotational speed is stored in memory. A ratio between the at least two rotational speed values stored in an immediately preceding ignition cycle is calculated, and the ignition timing of a present ignition cycle is corrected by using the calculated ratio.

3 Claims, 4 Drawing Sheets

IGNITION TIMING CONTROL METHOD FOR INTERNAL COMBUSTION ENGINES

BACKGROUND OF THE INVENTION

This invention relates to an ignition timing control method for internal combustion engines and, more particularly, to an ignition timing control method through which ignition timing can be accurately controlled even in the event of sudden acceleration or deceleration of the engine.

An example of an ignition timing control method for an internal combustion engine is disclosed in Japanese Patent Publication (Kokoku) No. 54-43649. This known method of controlling ignition timing includes the steps of calculating an advance angle control value before top dead center of the engine crankshaft, which value serves as the ignition timing best suited for the engine operating condition and is based on e.g. the rotational speed of the engine and absolute pressure in the engine intake pipe indicative of engine load, presetting a predetermined crank angle position, which serves as a reference position, indicative of a position advanced by a crank angle the magnitude of which is larger than the calculated advance angle control value, calculating a delay time by applying an angle-time conversion to a crank angle extending from the reference position to a crank angle position indicated by the calculated advance angle control value, and determining an ignition position by counting the delay time from the moment the reference position is sensed.

In this conventional method of controlling ignition timing, control is performed on the assumption that the engine will be rotating at the same velocity during the period of time extending from detection of the engine rotational speed, which is applied in the calculation of the advance angle control value, to the moment an ignition signal is generated. In actuality, however, the rotational speed of the engine is not constant in the above-mentioned time period. Accordingly, in order to control ignition timing accurately so that it will occur at the requisite crank angle position, the moment at which the engine rotational speed is sensed is made as close to the reference position as possible. Furthermore, since accuracy declines when counting is performed for too long, the delay time is made as small as possible.

However, if it were possible to accurately predict a fluctuation in engine rotational speed from engine rotational speeds sensed earlier in successive fashion, then not only would it become possible to achieve more accurate control of ignition timing when the engine is accelerating or decelerating, but ignition timing control also would no longer be adversely affected by a prolonged counting time.

SUMMARY OF THE INVENTION

It is therefore an object of the invention to provide an ignition timing control method for internal combustion engines, which method enables precise ignition timing control by following up fluctuations in the rotational speed of the engine.

The invention is based on the fact that the rotational speed of an internal combustion engine fluctuates, while exhibiting a particular tendency, due to a variation in torque generated by the engine during an engine cycle made up of intake, compression, explosion and exhaust strokes.

According to a preferred embodiment of the invention, the foregoing object is attained by providing an ignition timing control method for an internal combustion engine, including setting an ignition advance angle value conforming to the operating condition of the engine, obtaining an ignition timing found by applying an angle-time conversion to a crank angle extending from a reference crank angle position to a position corresponding to the ignition advance angle value, and effecting ignition upon lapse of the ignition timing from an instant at which the reference crank angle position is sensed, the method being characterized by comprising the following steps: sensing values of the rotational speed of the engine at least at two particular crank angle positions;

storing each of the at least two sensed rotational speed values in memory means;

calculating a ratio between the at least two rotational speed values stored in the memory means in an immediately preceding ignition cycle; and correcting the ignition timing of a present ignition cycle by using the calculated ratio.

Thus, according to the invention, ignition timing can be accurately controlled even if a fluctuation in the rotational speed of the engine occurs, and control errors can be minimized even if the counting time is prolonged.

The above and other objects, features and advantages of the invention will be apparent from the following description taken in conjunction with the accompanying drawings, in which like reference characters designate the same or similar elements or parts throughout the figures thereof.

DETAILED DESCRIPTION

A preferred embodiment of an ignition timing control method for an internal combustion engine according to the invention will now be described with reference to FIGS. 1 through 4.

Figure 1:
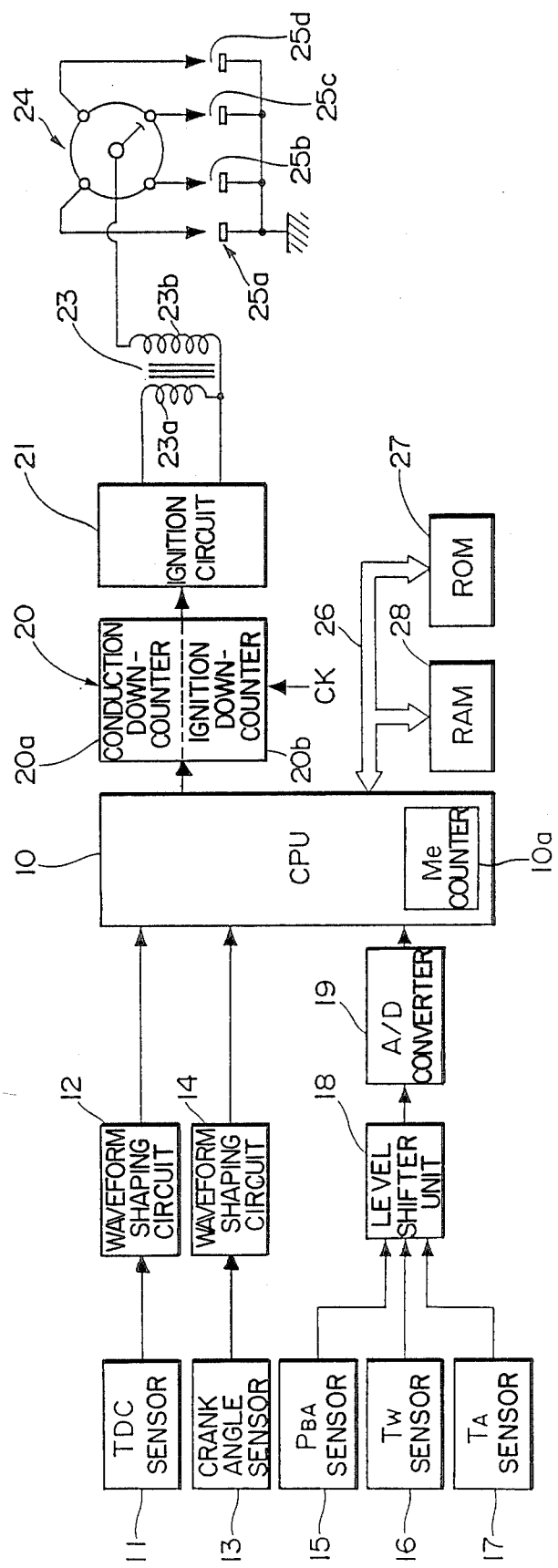
FIG. 1 is a block diagram illustrating the overall construction of an ignition timing control system for practicing the method of the present invention.

FIG. 1 illustrates the overall construction of an ignition timing control system for practicing the method of the invention. The illustrated exemplary ignition timing control system is for controlling the ignition timing of a four-cylinder internal combustion engine, not shown, and includes a central processing unit (hereafter referred to as "CPU") 10 having an input side to which sensors for sensing various parameters are connected. These sensors include a TDC sensor 11 arranged in facing relation, for example, to an engine camshaft, not shown, for generating a T04 signal pulse indicative of a reference crank angle position of each engine cylinder at a predetermined crank angle position (e.g. 10° BTDC) before the top dead center (TDC) position at the end of the compression stroke of each cylinder. The TDC sensor 11 is connected to the CPU 10 through a waveform shaping circuit 12. The waveform shaping circuit 12 receives T04 signal pulses from the TDC sensor 11 and shapes the pulses into rectangular pulses, shown in FIG. 2(a), which are applied to the CPU 10.

A crank angle sensor 13 which, like the TDC sensor 11, is arranged in facing relation to the camshaft, is adapted to generate 24 equally spaced pulses (i.e., pulses produced at a 30° interval in terms of the crank angle) during one full revolution of the camshaft, namely two full revolutions of the crankshaft, which is not shown. The crank angle sensor 13 is connected to the CPU 10 via a waveform shaping circuit 14, whereby the T24 signal pulses, shown in FIG. 2(b), are shaped before being applied to the CPU 10.

The remaining sensors include an absolute pressure (PBA) sensor 15 for sensing absolute pressure PBA in an intake pipe downstream of the engine throttle valve, neither of which are shown, an engine coolant temperature (TW) sensor 16 mounted in the peripheral wall of a cylinder filled with the engine coolant for sensing the coolant temperature TW, and an intake air temperature (TA) sensor 17 for sensing intake air temperature TA in the intake pipe downstream of the engine throttle valve. These sensors 15, 16, and 17 are connected to the CPU 10 via a level shifter unit 18 and an A/D converter 19. The absolute pressure sensor 15, engine coolant temperature sensor 16 and intake air temperature sensor 17 produce analog output signals each of which is shifted to a predetermined voltage level by the level shifter unit 18. Each analog signal so shifted is then converted into a digital signal by the A/D converter 19 before being fed into the CPU 10.

The CPU 10 has an output side connected to a down-counter 20 comprising a counter 20a for conduction and a counter 20b for ignition, both of which are driven at a clock CK. The down-counter 20 produces an output which is input to an ignition circuit 21. The latter has an output side connected to a primary coil 23a of an ignition coil 23, which also has a secondary coil 23b connected to spark plugs 25a–25d of the respective engine cylinders via a di-stributor 24.

The CPU 10 has an internal Me counter 10a for counting the time interval at which the T24 signal pulses are generated by the crank angle sensor 13. Also connected to the output side of the CPU 10 via a bus 26 are a ROM 27 storing an operational program and the like, and a RAM 28 for temporarily storing the results of calculations executed by the CPU 10 in accordance with the operational program, as well as other data.

Reference is now made to FIGS. 2 through 5 to describe the operation of the ignition timing control system constructed as set forth above.

Figure 2:
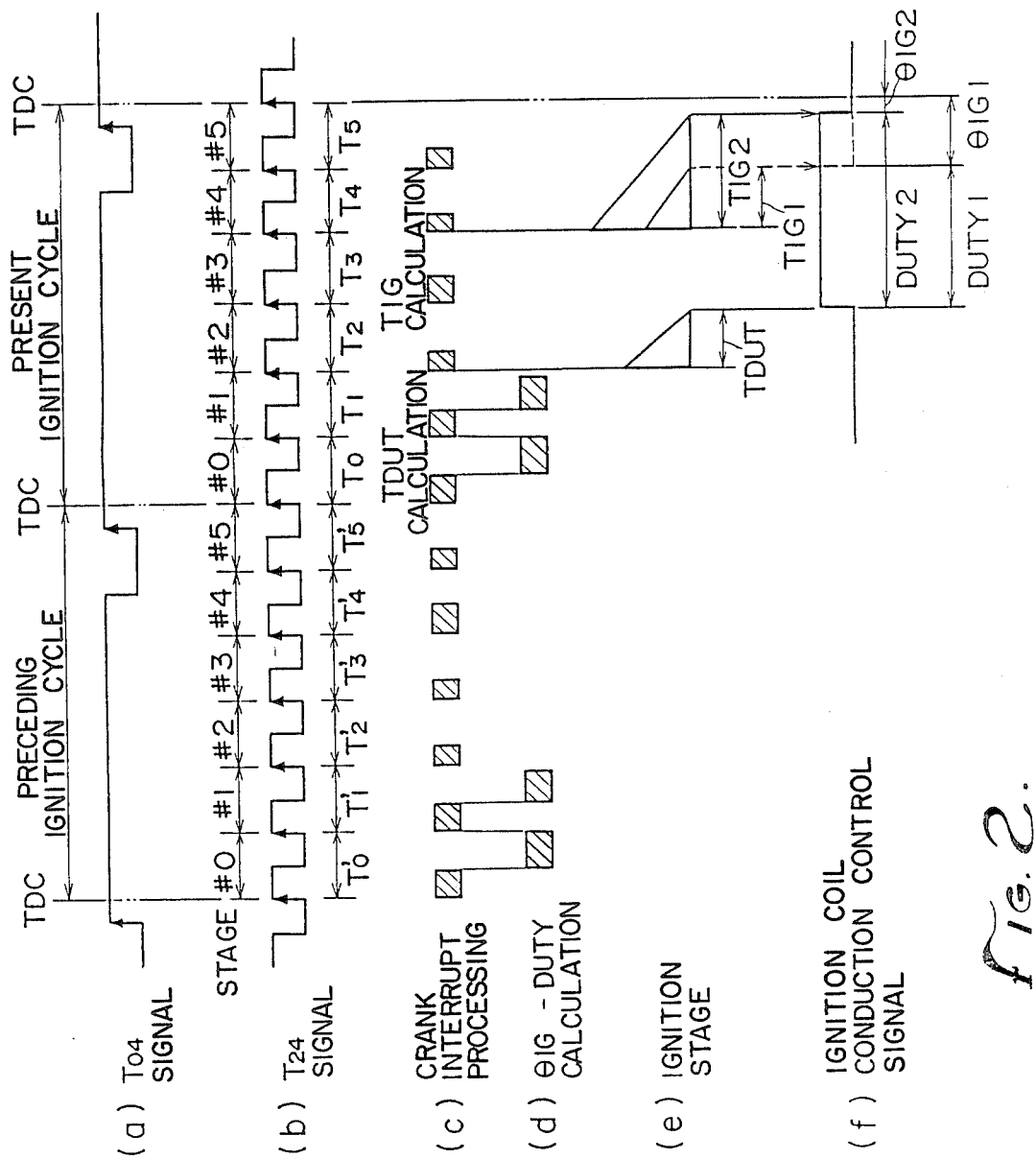
FIG. 2(a)-2(f) are timing charts illustrating the manner in which a crank angle signal T24 is generated, as well as the timing at which ignition timing TIG is calculated.

FIG. 2 is a timing chart illustrating ignition timing control applied to one cylinder (e.g. the first cylinder) of the four engine cylinders. The timing chart shows two ignition cycles, namely a preceding ignition cycle, which is the cycle for the second cylinder, and a present ignition cycle, which is for the first cylinder. Each of these ignition cycles is composed of six stages #0 through #5. The term "stage" as used herein refers to the time interval or spacing between the leading edge of each pulse of the T24 signal and the leading edge of the next pulse of this signal, namely to an interval equivalent to the crank angle of 30°. These stages are numbered consecutively from 0 to 5 starting from the first stage. Processing for execution of the ignition timing control program proceeds stage by stage. Specifically, the ignition timing control program comprises a crank interrupt processing program [(c) of FIG. 2] executed whenever a pulse in the T24 signal is generated, and a $\theta$IG-DUTY processing program [(d) of FIG. 2] executed following the end of the crank interrupt processing program. When a pulse in the T24 signal is input to the CPU 10 during execution of the $\theta$IG-DUTY processing program, execution of the crank interrupt processing program takes precedence.

In crank interrupt processing, a predetermined processing operation is executed at each and every stage. For instance, this operation includes sensing the T24 signal generation time interval Ti of each stage, calculating ignition timing TIG and conduction timing TDUT, both of which will be described later, determining a conduction stage (stage #2 in the embodiment of FIG. 2) at which the conduction counter 20a is to start counting as well as a predetermined stage (stage #4 in the embodiment of FIG. 2) at which the ignition counter 20b is to start, and starting the conduction counter 20a or ignition counter 20b.

$\theta$IG-DUTY processing involves computing such data as an advance angle control value $\theta$IG, and a conduction control value DUTY (the ratio of coil conduction time to the TDC signal pulse generation time interval).

The processing for each item of the above data will now be described in detail. The CPU 10 calculates the advance angle control value $\theta$IG from such values as the rotational speed Ne of the engine, absolute pressure PBA in the intake pipe and engine coolant temperature TW by using the equation $$\theta IG = \theta MAP + \theta IGCR \qquad (1)$$

In Equation (1), $\theta$MAP represents a basic advance angle value read out of a map, which is stored in the ROM 27, from a location decided by the rotational speed Ne and intake pipe absolute pressure PBA. $\theta$IGCR represents the value of a variable for correcting the basic advance angle value. $\theta$IGCR is read out of a table, stored in the ROM 27, from a location decided by the engine coolant temperature TW, intake air temperature TA, atmospheric pressure PA, etc.

The rotational speed (engine rpm) Ne used in calculating the value of $\theta$MAP is calculated as the reciprocal of a value Me (Me=T0+T1+T2+T3+T4+T5), namely a value obtained by adding together the time intervals Ti of the stages #0 through #5, Ti being the time interval at which the T24 signal pulses are generated. The time interval Ti is given by the status of the Me counter 10a, which counts the interval of each of the stages #0 through #5 using clock pulses of a predetermined period.

The conduction control value DUTY is a function of the rotational speed Ne and is read out of a table stored in the ROM 27 in a manner similar to that mentioned above. The value read out of the table is corrected by a value corresponding to the battery voltage supplied to the ignition coil before being applied for use.

A crank angle position at which conduction of the ignition coil 23 is to start is found from the advance angle control value $\theta$IG and conduction control value DUTY obtained as set forth above. In stage #2, which is where the crank angle position is located, the time needed to attain the crank angle position owing to rotation of the crankshaft from the instant at which the T24 signal pulse in stage #2 rises is treated as the conduction time TDUT. Data indicative of this conduction time TDUT are set in the conduction counter 20a. In the illustrated embodiment, the conduction counter 20a begins counting down from the leading edge of the T24 signal pulse in stage #2 and, when the value of the count reaches zero, the counter starts to apply a conduction control signal to the ignition circuit 21.

Figure 3:
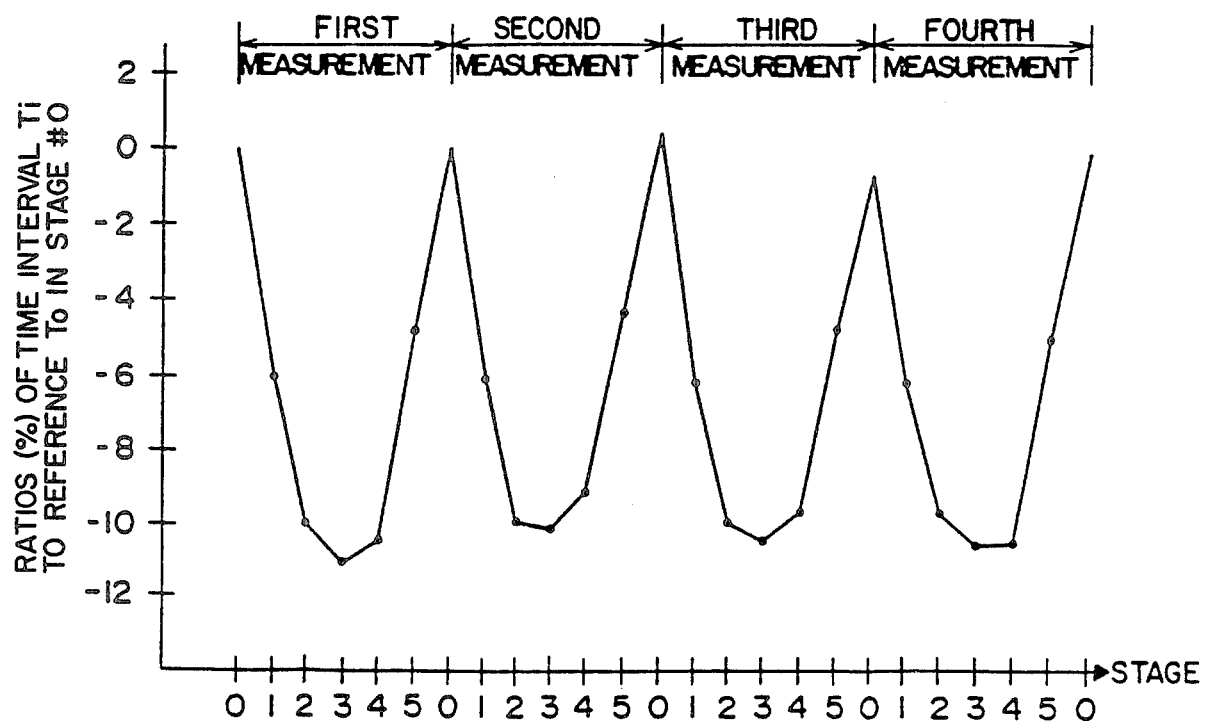
FIG. 3 is a diagram illustrating an example of actual measurement data indicating the manner in which the rotational speed of an engine fluctuates.

FIG. 3 shows actual measurement data indicative of the manner in which the rotational speed of an internal combustion engine fluctuates. In FIG. 3, the ordinate represents the ratios (%) of the T24 signal generation interval Ti to the interval To in stage #0. These data were acquired by reading out the value of the count (the T24 signal pulse generation interval Ti) recorded by the Me counter 10a at the start of each of the stages #0-#5, namely at the leading edge of each T24 signal pulse, when the engine was idling at a rotational speed of about 1000 rpm, and obtaining a percentage of increase or decrease in the counted values (T1-T5) in the respective stages #1-#5, with the counted value (To) in stage #0 serving as a reference.

In FIG. 3, it is noted that each pattern obtained by graphing the results of the respective measurement indicates that, starting from stage #0, at which the rotational speed of the engine is minimum immediately prior to the explosion stroke, the value of Ti decreases, i.e., rotational speed increases at a rapid rate, as the transition is made to stages #1 and #2 following the explosion stroke, until maximum speed is attained at stage #3. Then, since the engine enters the compression stroke, the rotational speed thereof begins decreasing at stage #4. As the end of the compression stroke is approached, the rate of decrease in the rotational speed becomes large in magnitude at stage #5 and, at stage #0, the rotational speed returns to the minimum value. The patterns repeat in a similar manner.

Thus, it will be understood that the rates of change in engine rotational speed in the stages #0 -#5 of each measurement resemble one another. It can be presumed from the measurement data that this similarity will hold even during acceleration and deceleration and, moreover, that mutually adjacent ignition cycles will exhibit a very high degree of similarity.

Accordingly, the facts indicated by the above measurement data reveal that if the value of To in stage #0 is made a reference, then a ratio k1 (=T4/To) or k2 (=T5/To) between the value of T4 or T5 in stage #4 or #5, at which ignition takes place, and the value of To will correctly represent the shape of the above-mentioned similar patterns. The present invention is based on this fact and, hence, is adapted to predict the T24 signal pulse generation time interval T4 in stage #4 of the present ignition cycle from the T24 signal pulse generation time interval Ti obtained in the immediately preceding ignition cycle, whereby a sudden increase or decrease in the rotational speed of the engine can be dealt with by performing precise ignition timing control.

A manner of calculating the ignition timing TIG in accordance with the invention will now be described with reference to FIG. 4. It should be noted that the flowchart of FIG. 4 relates only to the manner in which processing is executed to obtain the ignition timing TIG, and that this forms part of the crank interrupt handling program.

Figure 4:
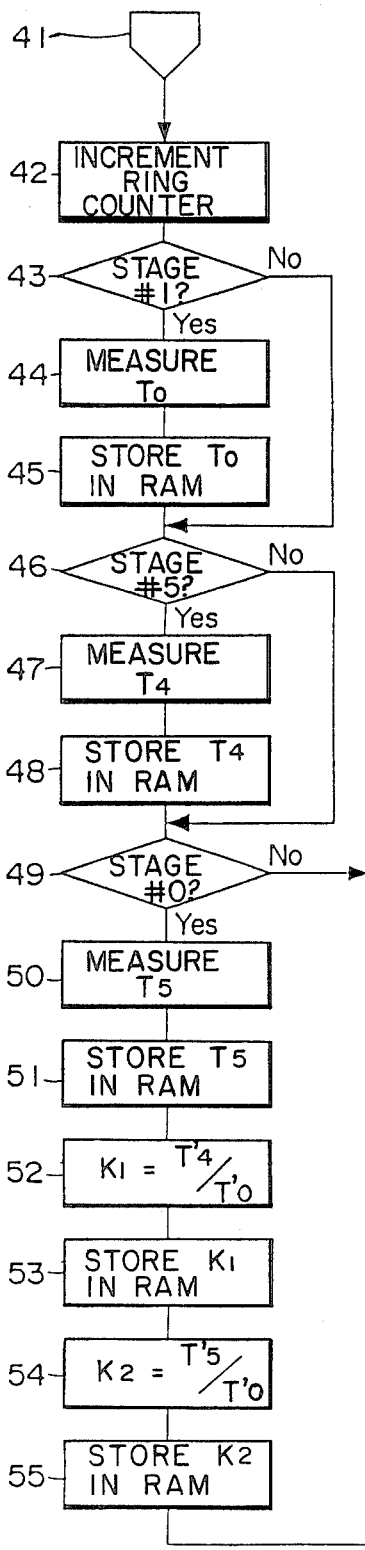
FIG. 4 is a flowchart illustrating a manner of executing processing for controlling the calculation of ignition timing TIG.
Figure 4:
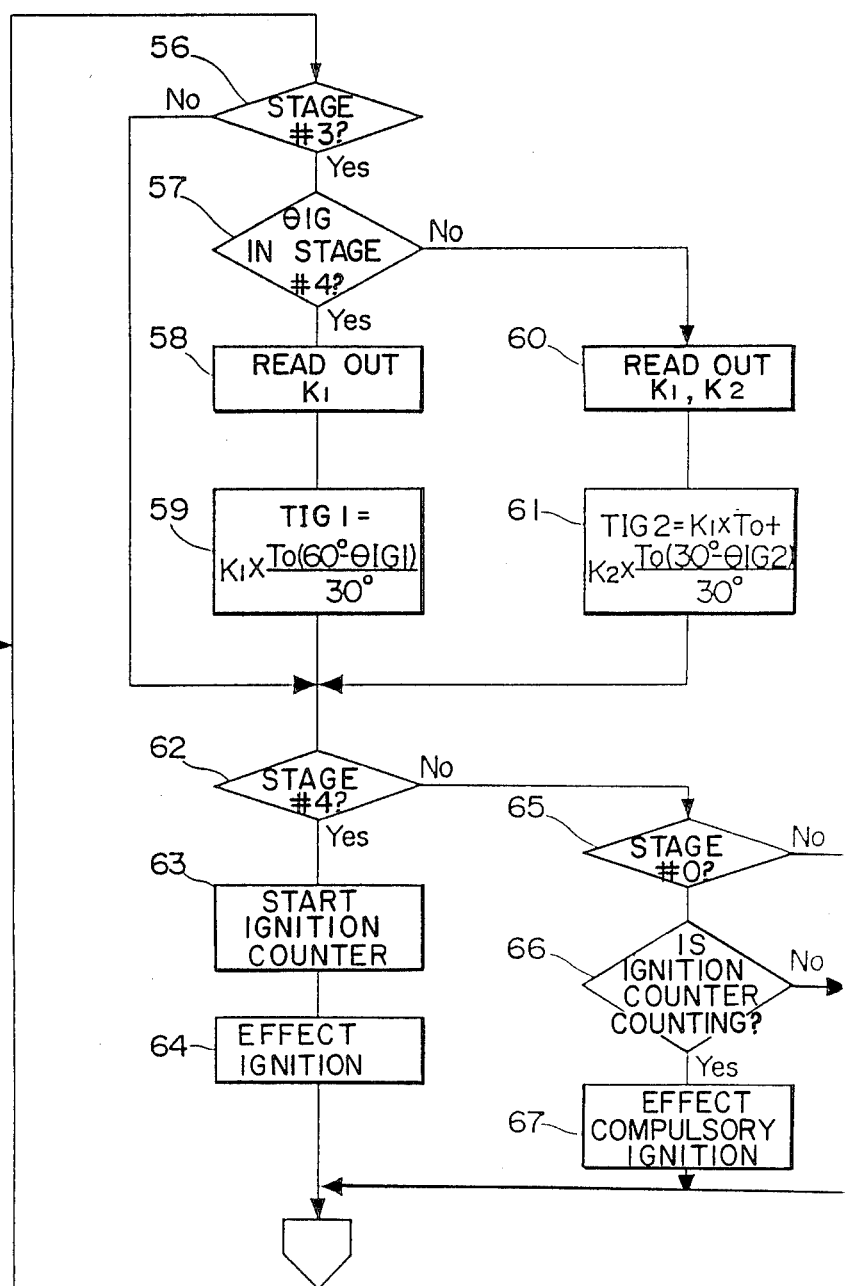

The first step in the flowchart of FIG. 4 is a step 41, at which the leading edge of a T24 signal pulse is sensed, followed by a step 42, at which a ring counter for counting the number of stages is incremented. Steps 43, 46, 49, 56, 62, 65 call for a determination, based on the value of the count in the ring counter, as to the number of the present stage.

The program proceeds from the step 42 to a step 43, at which the CPU 10 determines whether the present stage is stage #1. If the present stage is stage #1, then the value of the count in the Me counter 10a, namely the T24 signal pulse generation time interval To in stage #0, is read at a step 44 and stored in the RAM 28 at a step 45. This is followed by the step 46. If the answer to the step 43 is negative (NO), then the program skips steps 44 and 45 and proceeds to the step 46.

The step 46 calls for the CPU 10 to determine whether the present stage is stage #5; if it is, then the value of the count in the Me counter 10a, namely the T24 signal pulse generation time interval T4 in stage #4, is read at a step 47 and stored in the RAM 28 at a step 48. This is followed by the step 49. If the answer to the step 46 is NO, then the program proceeds directly to the step 49. Similarly, the step 49 calls for the CPU 10 to determine whether the present stage is stage #0; if it is, then the T24 signal pulse generation time interval T5 in stage #5 is read at a step 50 and stored in the RAM 28 at a step 51.

Next, at a step 52, the CPU 10 reads the T24 signal pulse generation time intervals To', T4' out of the RAM 28, in which the values of these time intervals were stored in the immediately preceding ignition cycle, and calculates the ratio k1 (=T4'/To') between the values of To' and T4'. The CPU 10 stores k1 in the RAM 28 at a step 53. This is followed by a step 54, at which the CPU 10 reads the T24 signal pulse generation time intervals To', T5' out of the RAM 28, in which the values of these time intervals were stored in the immediately preceding ignition cycle, and calculates the ratio k2 (=T5'/To') between the values of To' and T5'. The CPU 10 stores k2 in the RAM 28 at a step 55. This is followed by the step 56. If the answer to the step 49 is NO, then the program skips steps 50 through 55 and proceeds to the step 56.

The step 56 calls for the CPU 10 to determine whether the present stage is stage #3, namely whether the present stage is a stage immediately precedent to stage #4, at which the ignition counter 20b is to start counting. If the answer to the step 56 is NO, the program proceeds to the step 62 without steps 57 through 61 being executed. If a YES answer is obtained at the step 56, the CPU 10 determines at a step 57 whether the advance angle control value $\theta$IG obtained by the $\theta$IG-DUTY processing set forth earlier is in either stage #4 or #5, these stages corresponding to the ignition control range (0° through 60° before TDC). In other words, it is determined whether the calculated advance angle control value $\theta$IG is within a range of 30° to 60° (stage #4) or 0° to 30° (stage #5).

If the advance angle control value $\theta$IG is a value ($\theta$IG1) within the range of 30° to 60°, the answer to step 57 is YES and the program proceeds to a step 58, at which the ratio k1 obtained at the step 52 is read out of the RAM 28, and then to a step 59 at which the CPU 10 obtains a value TIG1 of ignition timing in accordance with the following equation:

$$TIG1 = k1 \times \frac{To(60° - \theta IG1)}{30°} \qquad (2)$$

In the above equation, To is the T24 signal pulse generation time interval in stage #0 of the present ignition cycle, and the ratio kl is defined by k1=T4'/To'. As set forth above in connection with FIG. 3, the patterns indicative of a fluctuation in engine rotational speed during one ignition cycle are constant and, if there is adopted as a reference the T24 signal pulse generation time interval To' in the vicinity of TDC, namely stage #0, at the end of the compression stroke where the rotational speed undergoes the greatest decrease during the ignition cycle, then the ratio k1 (k1=T4'/To') between this reference time interval To' and the time interval T4' in stage #4 will accurately represent the ratio of rotational speed in stage #4 to the rotational speed in stage #0. Accordingly, if the ratio k1 is multiplied by the time interval To in stage #0 of the present ignition cycle, then the time interval T4 in stage #4 of the present ignition cycle can be predicted. Then, if this predicted time interval in stage #4 is multiplied by the value $[(60-\theta IG1)/30°]$, an angle-time conversion is achieved and there is obtained a value of ignition timing TIG that takes into account a sudden increase or decrease of the engine rotational speed.

Further, if the advance angle control value $\theta IG$ is determined to be a value $(\theta IG2)$ within the range of 0° to 30° at the step 57, the program proceeds to a step 60, at which the ratios k1, k2 respectively obtained at the steps 52, 54 are read out of the RAM 28, and then to a step 61, at which the CPU 10 obtains a value TIG2 of ignition timing in accordance with the following equation:

$$TIG2 = k1 \times To + k2 \times \frac{To(60° - \theta IG1)}{30°} \quad (3)$$

where k1=T4'/To', k2=T5'/To'. It may readily be seen from Equation (2) that the value of the first term (k1×To) on the right side of Equation (3) is the predicted value of the T24 signal pulse generation time interval T4 in stage #4 of the present ignition cycle, and that the value of the second term (k2×To) is the predicted value of the T24 signal pulse generation time interval T5 in stage #5 of the present ignition cycle. Even if the advance angle control value $\theta IG$ is in the range of 0° to 30°, a value of ignition timing TIG that takes a sudden increase or decrease in the engine rotational speed into account is obtained, just as in step 59 described above.

Next, the step 62 calls for a determination as to whether the present stage is stage #4. If a YES answer is received, the program proceeds to a step 63, at which the value TIG1 of ignition timing obtained at the step 59 or the value TIG2 of ignition timing obtained at the step 61 is set in the ignition counter 20b and the counter is caused to start counting down from this value. When the count in the ignition counter 20b reaches a value of zero, current is cut off from the ignition coil 23. In other words, ignition is effected at a step 64 and execution of the present program is ended.

If the decision at the step 62 is negative, on the other hand, the program proceeds to a step 65, at which the CPU 10 determines whether the present stage is stage #0. If the answer received at this step is NO, the present program is ended. If a YES answer is obtained, however, the program proceeds to a step 66, at which it is determined whether the ignition counter 20b, which started the down-count operation at the step 63, is still counting. No problem is encountered so long as ignition has already been achieved. However, if ignition has not taken place when the crankshaft passes through TDC while the ignition counter 20b is still counting, current is cut off from the coil 23 immediately to effect compulsory ignition at a step 67. The present program is then ended. The reason for effecting ignition compulsorily is that combustion of the mixture in the engine cylinders is adversely affected when ignition occurs after the crankshaft has passed through TDC at the end of the compression stroke.

As many apparently widely different embodiments of the present invention can be made without departing from the spirit and scope thereof, it is to be understood that the invention is not limited to the specific embodiments thereof.

What is claimed is:

1. An ignition timing control method for an internal combustion engine in which an ignition advance angle value conforming to the operating condition of the engine is set, an ignition timing is obtained by applying an angle-time conversion to a crank angle extending from a reference crank angle position which corresponds to a predetermined position within an ignition cycle of the engine to a position corresponding to said ignition advance angle value, and ignition is effected upon lapse of said ignition timing from an instant at which said reference crank angle position is sensed, the method comprising the steps of:
    sensing values of the rotational speed of the engine at least at two particular crank angle positions within an immediately preceding ignition cycle
    storing each of said at least two sensed rotational speed values in memory means;
    calculating a ratio between said at least two rotational speed values stored in the memory means in said immediately preceding ignition cycle; and
    correcting said ignition timing of a presesnt ignition cycle by using said calculated ratio.

2. The method as claimed in claim 1, wherein said particular crank angle positions include a crank angle position in the vicinity of top dead center at the end of a compression stroke of the engine, and a crank angle position in the vicinity of said position corresponding to the ignition advance angle value.

3. The method as claimed in claim 1, wherein said ignition timing is corrected by being multiplied by said calculated ratio.

* * * * *